United States Patent
Goebelbecker et al.

(10) Patent No.: US 7,810,328 B2
(45) Date of Patent: Oct. 12, 2010

(54) PARALLEL-SEQUENTIAL TURBOCHARGING FOR IMPROVED EXHAUST TEMPERATURE CONTROL

(75) Inventors: Michael Goebelbecker, Dearborn Heights, MI (US); Kevin Murphy, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 905 days.

(21) Appl. No.: 11/677,007

(22) Filed: Feb. 20, 2007

(65) Prior Publication Data

US 2008/0196409 A1  Aug. 21, 2008

(51) Int. Cl.
  *F02B 33/44* (2006.01)
  *F02B 33/00* (2006.01)
  *F01N 7/00* (2006.01)
  *F01N 7/10* (2006.01)

(52) U.S. Cl. .............. 60/612; 60/322; 60/323; 123/562

(58) Field of Classification Search ............. 60/612, 60/320–323; 123/562
See application file for complete search history.

(56) References Cited

U.S. PATENT DOCUMENTS

| | | | |
|---|---|---|---|
| 3,835,892 A * | 9/1974 | Keller | 138/178 |
| 5,186,005 A | 2/1993 | Yoshioka et al. | 60/612 |
| 5,307,628 A | 5/1994 | Castagne | 60/284 |
| 5,404,716 A * | 4/1995 | Wells et al. | 60/272 |
| 5,419,127 A * | 5/1995 | Moore, III | 60/322 |
| 5,579,639 A * | 12/1996 | Shimoji et al. | 60/322 |
| 5,689,954 A * | 11/1997 | Blocker et al. | 60/322 |
| 6,338,250 B1 | 1/2002 | Mackay | 60/612 |
| 6,708,485 B2 | 3/2004 | Hinder et al. | 60/320 |
| 7,165,403 B2 * | 1/2007 | Sun et al. | 60/612 |
| 2006/0021347 A1 * | 2/2006 | Sun et al. | 60/612 |
| 2008/0034752 A1 * | 2/2008 | Becker et al. | 60/612 |
| 2010/0011762 A1 * | 1/2010 | Hokuto et al. | 60/602 |

FOREIGN PATENT DOCUMENTS

JP  07293262 A  * 11/1995

* cited by examiner

*Primary Examiner*—Thai Ba Trieu
(74) *Attorney, Agent, or Firm*—Julia Voutyras; Alleman Hall McCoy Russell & Tuttle LLP

(57) ABSTRACT

A method is described for controlling the exhaust temperature of an emission controlling device in the exhaust using both a higher heat loss path and a lower heat loss path along with parallel/sequential turbocharging. The exhaust path is adjusted based on a rate of change of temperature control error.

21 Claims, 6 Drawing Sheets

PARALLEL-SEQUENTIAL TURBOCHARGING FOR IMPROVED EXHAUST TEMPERATURE CONTROL

BACKGROUND AND SUMMARY

Internal combustion engines are commonly used in today's automobiles. Since inducted air is used to burn fuel and produce power in this type of engine, engine power may be limited by the amount of air that can be inducted into the combustion chamber. Turbochargers may be used to increase the air inducted to the combustion chamber compared with a naturally aspirated system. Further, some automobiles may employ a dual turbocharger system, which can reduce turbo lag while maintaining peak boosting performance by allowing the operation of a single turbocharger at lower engine speed and the operation of dual turbochargers at higher engine speed.

One type of dual turbocharger system is described in U.S. Pat. No. 5,186,005. In this particular dual turbocharger system, twin turbochargers are arranged in a parallel fashion with respect to the engine, and a crossover pipe connects the twin turbochargers. One turbocharger is operated at low engine load/speed while both turbochargers are operated at high engine load/speed. The switch from the single turbocharger operation to the dual turbocharger operation is based on the intake air quantity. However the switch back to the single turbocharger operation is based on the speed, that is, once a dual turbocharger operation is achieved it is only changed back to a single turbocharger operation when the engine speed is below a certain set value, irrespective of the intake air quantity change.

However, one issue associated with such dual turbocharger systems and possibly other dual turbocharger systems is that it may be difficult to maintain the exhaust temperature within a proper range for the optimal operation of a device in the emission control system for reducing emissions in the exhaust. For example, if the exhaust temperature is too cold, the efficiency of the device may be low; and if the exhaust temperature is too hot, the device may degrade physically or chemically in the example of a catalytic device. During some conditions, for example when the engine has just been started or when the engine is operated at a low speed, the exhaust temperature may be too low for efficient operation or catalytic conversion. Yet during other conditions, for example when the engine is operated at a high speed or load, the exhaust temperature may be too high, which may cause a catalyst to degrade.

The inventors herein have recognized the above issues and that such issues may be at least partially addressed by an exhaust system for an engine having a first set and a second set of cylinders, a first turbocharger coupled to the first set of cylinders and a second turbocharger coupled to the second set of cylinders, and an emission control device. Specifically, the exhaust system may include a lower heat loss path that is coupled to and downstream of the first turbocharger, a higher heat loss path that is coupled to and downstream of the second turbocharger, a crossover pipe coupled between and upstream of the first and the second turbocharger that provides a passage between the higher heat loss path and the lower heat loss path, and a control mechanism for adjusting flow in the crossover pipe.

By providing both a higher heat loss and a lower heat loss path with a crossover that allows communication between the two paths, and by providing a mechanism to control the flow through the higher heat loss and the lower heat loss paths, the exhaust temperature may be better controlled to increase the efficiency of the emission control device operation in a dual turbocharger environment. Under certain conditions, for example, when the engine is operating at a lower load/speed, the exhaust flow through the higher heat loss path is reduced and the exhaust flow through the lower heat loss path is increased to reduce heat loss; while under certain other conditions, for example, when the engine is operating at a higher load/speed, the exhaust flow through the higher heat loss path is increased and the exhaust flow through the lower heat loss path is decreased to increase heat loss from the exhaust.

Further, by placing the crossover between the higher heat loss path and the lower heat loss path upstream of both turbochargers, it is possible to achieve (1) a faster boost response because only one turbocharger has to be spun up and this turbocharger will receive twice as much airflow compared to if both turbochargers have to be spun up, and (2) a faster exhaust warm-up because all exhaust flows through the lower heat loss path and the cooling that may result from air expansion in the second turbocharger is reduced.

As such, it is possible to provide an internal combustion engine that has a dual turbocharger system and an emission control device with mechanisms to control the exhaust temperature for improved operation of the emission control device.

While the above example is illustrated with regard to a dual turbocharger system, the concepts may be equally applicable, if not more applicable, to other turbocharger systems.

DETAILED DESCRIPTION

Figure 1:
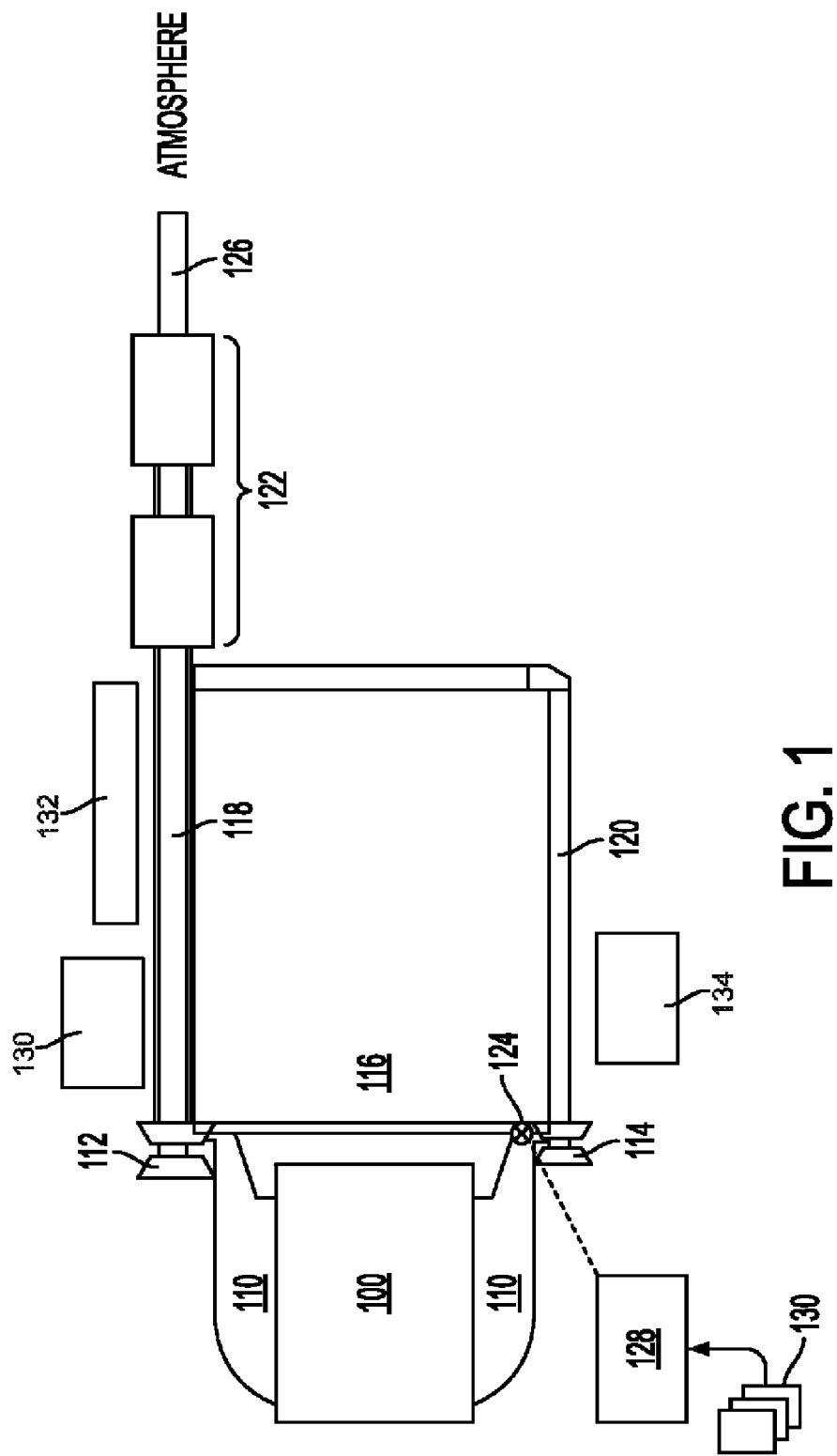
FIG. 1 is a system diagram of an example engine system showing a double wall feature for the lower heat loss path and a single wall feature for the higher heat loss path.

As illustrated in FIG. 1, an internal combustion engine with a dual turbocharger system in accordance with a first embodiment includes a multi-cylinder engine block 100, an exhaust manifold 110, a first turbocharger 112, a second turbocharger 114, a lower heat loss path 118, a higher heat loss path 120, an emission control device 122, an exhaust tail-pipe 126 that opens into the atmosphere, a crossover 116 that provides a passage between the lower heat loss path 118 and the higher heat loss path 120, and a control mechanism 124 that can control the exhaust flow through the crossover 116.

The exhaust manifold 110 is connected to the engine exhaust outlets and includes a first portion connected to a first group of engine cylinders and a second portion connected to a second group of engine cylinders. The exhaust manifold 110 is also connected to the turbochargers with the first portion connected to the first turbocharger 112 and the second portion connected to the second turbocharger 114. In this example, exhaust gasses from the first group of cylinders are maintained separate from exhaust gasses from the second group of cylinders, and are later mixed together before entry into the emission control device 122. However, various other configurations may be used, if desired.

The turbochargers are arranged downstream of the engine and the exhaust manifold and are arranged in a parallel configuration, with each turbocharger coupled exclusively to a cylinder group separate from other cylinder groups. The first turbocharger 112 is coupled to and upstream of the lower heat loss path 118 and the second turbocharger 114 is coupled to and upstream of the higher heat loss path 120. The turbocharger may be of various types of turbochargers, for example, it may be a fixed geometry turbocharger or it may be a variable geometry turbocharger. Further, it may be a variable nozzle turbocharger or include a bypass waste gate. Each turbocharger includes a least a turbine and a compressor. The engine exhaust drives the turbine (not shown), which in turn drives the compressor (not shown), which in turn compresses the engine intake air (not shown).

The lower heat loss path 118 may contain one or more features that contribute to its lower heat loss quality, for example, the path may contain a double wall or a thicker wall, may have a shorter path length compared to the higher heat loss path, it may be lined with insulating materials 130, and/or it may be heated for example with an electric source 132.

Conversely, the higher heat loss path 120 may contain one or more features that contribute to its higher heat loss quality, for example, the path may contain a single wall or a thinner wall (as compared to path 118), it may have more pipe bends and/or have a longer pipe length compared to the lower heat loss path, and/or it may be cooled by a cooling device 134. Further, it may be located further from heat sources as compared to path 118. For example, it may be located further from heat rejected from heat exchangers, or it may be located in a region with reduced airflow generated by vehicle motion.

The crossover 116 provides a passage between the lower heat loss path 118 and the higher heat loss path 120. The crossover 116 may be placed upstream of both turbochargers, but it may also be placed downstream of one or both of the turbochargers. By placing the crossover 116 upstream of both turbochargers, it is possible to achieve (1) a faster boost response because only one turbocharger has to be spun up and this turbocharger will receive twice as much airflow compared to if both turbochargers have to be spun up, and (2) a faster exhaust warm-up because all exhaust flows through the lower heat loss path and the cooling that may result from air expansion in the second turbocharger is reduced. Further, when combined with control mechanism 124, crossover 116 may provide a variable flow path that can vary flow depending on operating conditions of the engine or vehicle.

The internal combustion engine may be one or more of a various types of internal combustion engines, for example it may be a rotary-piston engine or a reciprocating piston engine. The internal combustion may burn various types of fuels, for example it may be a gasoline burning or a diesel fuel burning engine. Additionally, the internal combustion engine may use different stroke cycles, for example it may use a two-stroke or a four-stroke cycle. Furthermore, the cylinders of the engine may be laid out in various configurations with at least two groups. For example, the cylinders may be arranged in a line as in in-line engines, arranged in a v configuration as in v engines, arranged in a w configuration as in w engines, arranged into two opposing banks of cylinders as in flat engines, or a combination of different engine configurations.

The emission control device 122 may contain one or more of individual components, which may for example be catalytic converters, evaporative emission devices, scrubbing devices for hydrocarbon and/or sulfur, particulate filters, traps, adsorbers, and non-thermal plasma reactors. The emission control device may also contain various sensors, such as oxygen sensors and temperature sensors, etc. The catalytic converter in the emission control device may contain one or more types of catalysts, for example oxidation catalysts, such as platinum and rhodium for oxidizing carbon monoxide (CO) and unburned hydrocarbons (HC), and reduction catalysts, such as platinum and palladium for reducing oxides of nitrogen (NOx). Further, it may be a selective catalyst reduction (SCR) catalyst, a lean NOx trap, or combinations of various types of catalysts. The catalytic converter may be of different physical structures, such as ceramic honeycombs, metal plates and ceramic beads, or a combination of different physical structures.

The control mechanism 124 for controlling the amount of exhaust that flows through the crossover 116 may contain one or more suitable valves, such as, needle valves, butterfly valves, ball valves, globe valves, angle globe valves, and/or gate valves; and it may be operated by one or more suitable actuators, such as electric solenoid actuators, pneumatic actuators, hydraulic actuators, and/or electric motor driven actuators.

Still referring to FIG. 1, When the control mechanism 124 is in an open position or in a partially open position, part of the exhaust flows through the higher heat loss path; and when the control mechanism 124 is in a closed position, exhaust that flows through the higher heat loss path is shut off and all the exhaust is directed towards and flows through the lower heat loss path. The engine control unit (ECU) may in some embodiments be used to control the operation of the control mechanism 124. For example, when the exhaust temperature is below a desired lower operating temperature, TdL, of the emission control device 122, for example when the engine has just started (e.g. within 5-10 minutes of engine start) or when the ambient temperature is relatively low (e.g. <−20° C.), the engine control unit (ECU) 128 sends out signals to the control mechanism 124 to increase exhaust flow to the lower heat loss path 118 and/or decrease exhaust flow to the higher heat loss path 120. As more exhaust flows through the lower heat loss path 118 and less exhausts flow through the higher heat loss path 120, less cooling of the exhaust and/or warming of the exhaust prior to entering the emission control device 122 results. Conversely, when the exhaust temperature is above a desired upper operating temperature, TdU, of the emission control device 122, for example when the engine has been continuously running at high speed for a long time or when the ambient or exhaust temperatures are relatively high, the engine control unit (ECU) 128 sends out signal to the control mechanism 124 to decrease exhaust flow to the lower heat loss path 118 and/or increase exhaust flow to the higher heat loss path 120. As less exhaust flows through the lower heat loss path 118 and more exhaust flows through the higher heat loss path 120, greater cooling of the exhaust prior to entering the emission control device is achieved. Further details of such control operations are described further with regard to FIGS. 3-6.

If the control mechanism 124 is located upstream of one or both turbochargers, the exhaust that flows through one or both turbochargers may be adjusted in a similar fashion.

Although the above example describes control of exhaust temperature or catalyst temperature for improved operation of the catalytic converter emission control device via adjustment of mechanism 124, in some situations temperature control may be used for efficient operation of other types of emission control devices.

In some embodiments, the control mechanism 124 may be coupled to and/or controlled by an engine control unit (ECU) 128. ECU may further adjust various other exhaust or engine actuators in response to various feedback mechanisms. For example, ECU 128 may be coupled to various engine throttles, for adjusting various engine parameters, such as air/fuel ratio, ignition timing, firing order, exhaust gas recirculation, and positive crankcase ventilation, to increase engine efficiency and therefore decrease emission. Further, ECU 128 may receive input from various engine or exhaust sensors as indicated at 130.

Figure 2:
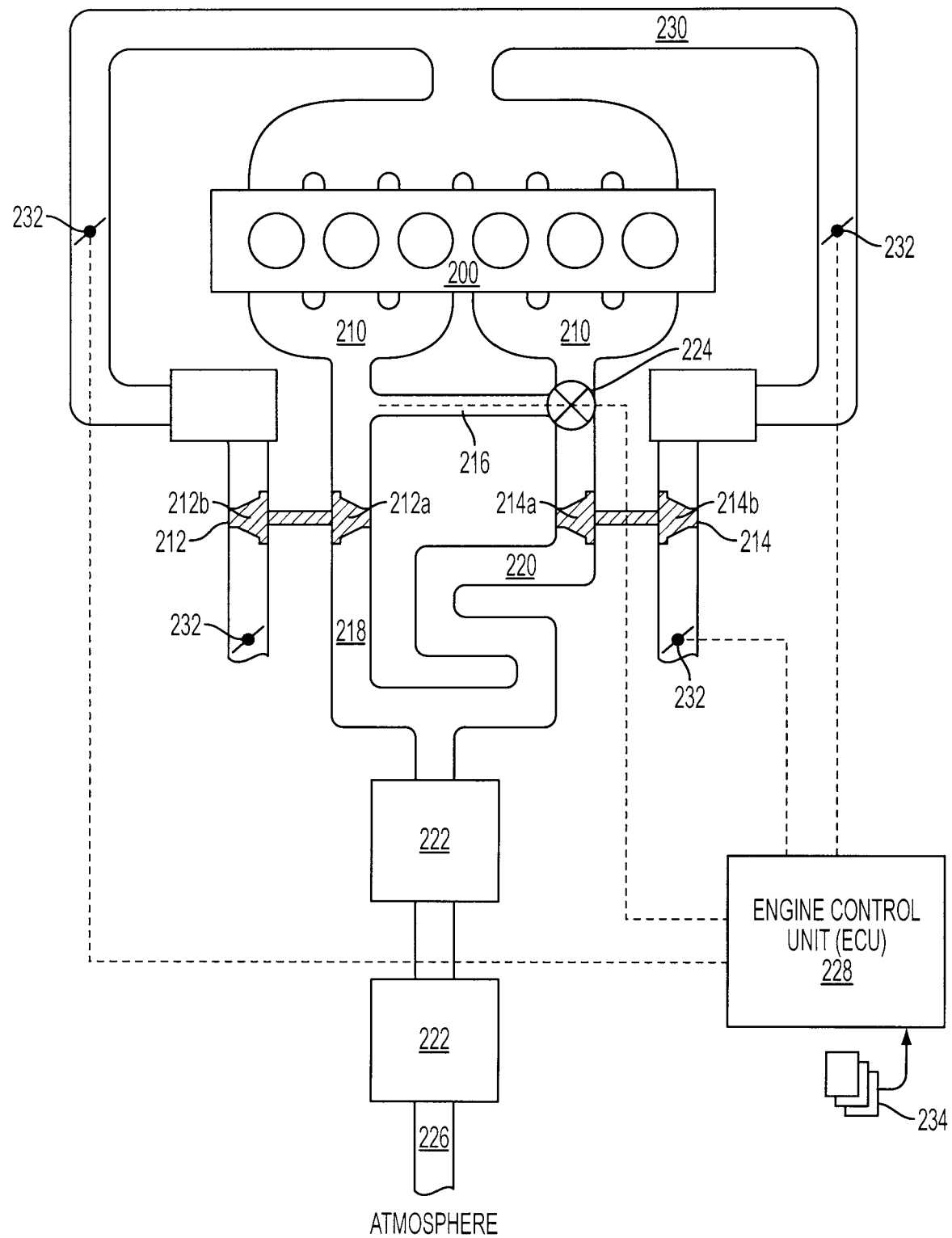
FIG. 2 is a system diagram of an alternative engine system showing features such as a longer pipe length and more pipe bends for the lower heat loss path.

FIG. 2 illustrates an engine system with a dual turbocharger system in accordance with a second embodiment includes an in-line engine block 200, an engine intake conduit 230, an exhaust manifold 210, a first turbocharger 212, a second turbocharger 214, a lower heat loss path 218, a higher heat loss path 220, an emission control device 222, an exhaust tail-pipe 226 that opens into the atmosphere, a crossover 216 that provides a passage between the lower heat loss path 218 and the higher heat loss path 220, a control mechanism 224 that can control the exhaust flow through the crossover 216, and an engine control unit (ECU) for controlling the operation of the mechanism 224, sometimes in coordination with various engine throttles 232.

In this particular embodiment, the control mechanism 224 is located immediately upstream of the lower heat loss path and serves to cut off the exhaust flow through the lower heat loss path when it is in a closed position, and to enable various levels of flow to 216 as the valve is opened.

The exhaust manifold 210 is connected to the engine exhaust outlets and includes a first portion connected to a first group of engine cylinders and a second portion connected to a second group of engine cylinders. The exhaust manifold 210 is also connected to the turbochargers with the first portion connected to the first turbocharger 212 and the second portion connected to the second turbocharger 214. In this example, exhaust gasses from the first group of cylinders are maintained separate from exhaust gasses from the second group of cylinders, and are later mixed together prior to entry into the emission control device 222. However, various other configurations may be used, if desired. The turbochargers are arranged downstream of the engine and the exhaust manifold and are arranged in a parallel configuration, with each turbocharger coupled exclusively to a cylinder group separate from other cylinder groups. The first turbocharger 212 is coupled to and upstream of the lower heat loss path 218 and the second turbocharger 214 is coupled to and upstream of the higher heat loss path 220. The turbocharger may be of various types of turbochargers, as discussed in reference to FIG. 1. The engine exhaust drives the turbine 212a 214a, which in turn drives the compressor 212b 214b, which in turn compresses the engine intake air flowing through the engine intake conduit 230.

In this particular embodiment, the lower heat loss path 218 has a double wall and a shorter path length compared to the higher heat loss path 220; and the higher heat loss path 220 is shown to have more pipe bends and longer path length compared to the lower heat loss path 218.

The lower heat loss path 218 may contain one or more features that contribute to its lower heat loss quality; conversely, the higher heat loss path 220 may contain one or more features that contribute to its higher heat loss quality, as discussed previously in reference to FIG. 1.

The crossover 216 provides a passage between the lower heat loss path 218 and the higher heat loss path 220. In this particular embodiment, the crossover 216 is placed upstream of both turbochargers. In other embodiments the crossover may be placed downstream of one or both of the turbochargers in other embodiments. With similar reasoning as provided for FIG. 1, by placing the crossover 216 upstream of both turbochargers, it is possible to achieve (1) a faster boost response and (2) a faster exhaust warm-up. Further, when combined with control mechanism 224, crossover 226 may provide a variable flow path that can vary flow depending on operating conditions of the engine or vehicle.

The internal combustion engine 200 may be one or more of a various types of internal combustion engines, as discussed previously in reference to FIG. 1.

The emission control device 226 may contain one or more of individual units/sub-components and may contain various sensors, as discussed previously in reference to FIG. 1. The catalytic converter in the emission control device may contain one or more types of catalysts, as discussed previously in reference to FIG. 1. The catalytic converter may be of different physical structures, as discussed previous in reference to FIG. 1.

The control mechanism 224 for controlling the amount of exhaust that flows through the crossover 216 may contain one or more suitable valves, as discussed previously in more detail in reference to FIG. 1.

In this particular embodiment, still referring to FIG. 2, when the control mechanism 224 is in an open position or in a partially open position, part of the exhaust flows through the lower heat loss path 218; and when the control mechanism 224 is in a closed position, exhaust flow through the lower heat loss path 218 is shut off and all the exhaust is directed towards and flows through the lower heat loss path 220. Also in this particular embodiment, the control mechanism 224 is located upstream of one or both turbochargers, the exhaust that flows through the one or both turbochargers may be adjusted in a similar fashion.

In this embodiment, still referring to FIG. 2, the mechanism 224 is coupled to and controlled by an engine control unit (ECU) 228, and the engine control unit (ECU) also controls one or more of the throttle 232. As discussed previously in reference to FIG. 1, the engine control unit (ECU) may adjust exhaust flow path and therefore exhaust temperature by controlling the operation of the control mechanism.

Exemplary engine and exhaust system controls to maintain exhaust temperature operation in desired ranges using the example systems of FIGS. 1 and 2 are described herein. In particular, control routines are described below which may be used with various engine and exhaust configurations, such as those described in FIGS. 1 and 2.

The specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments described herein, but is provided for ease of illustration and description. Although not explicitly illustrated, the illustrated acts or functions may be repeatedly performed depending on the particular strategy being used, during engine operation.

Further, these figures may graphically represent code to be programmed into the computer readable storage medium in a controller or control system.

Figure 3:
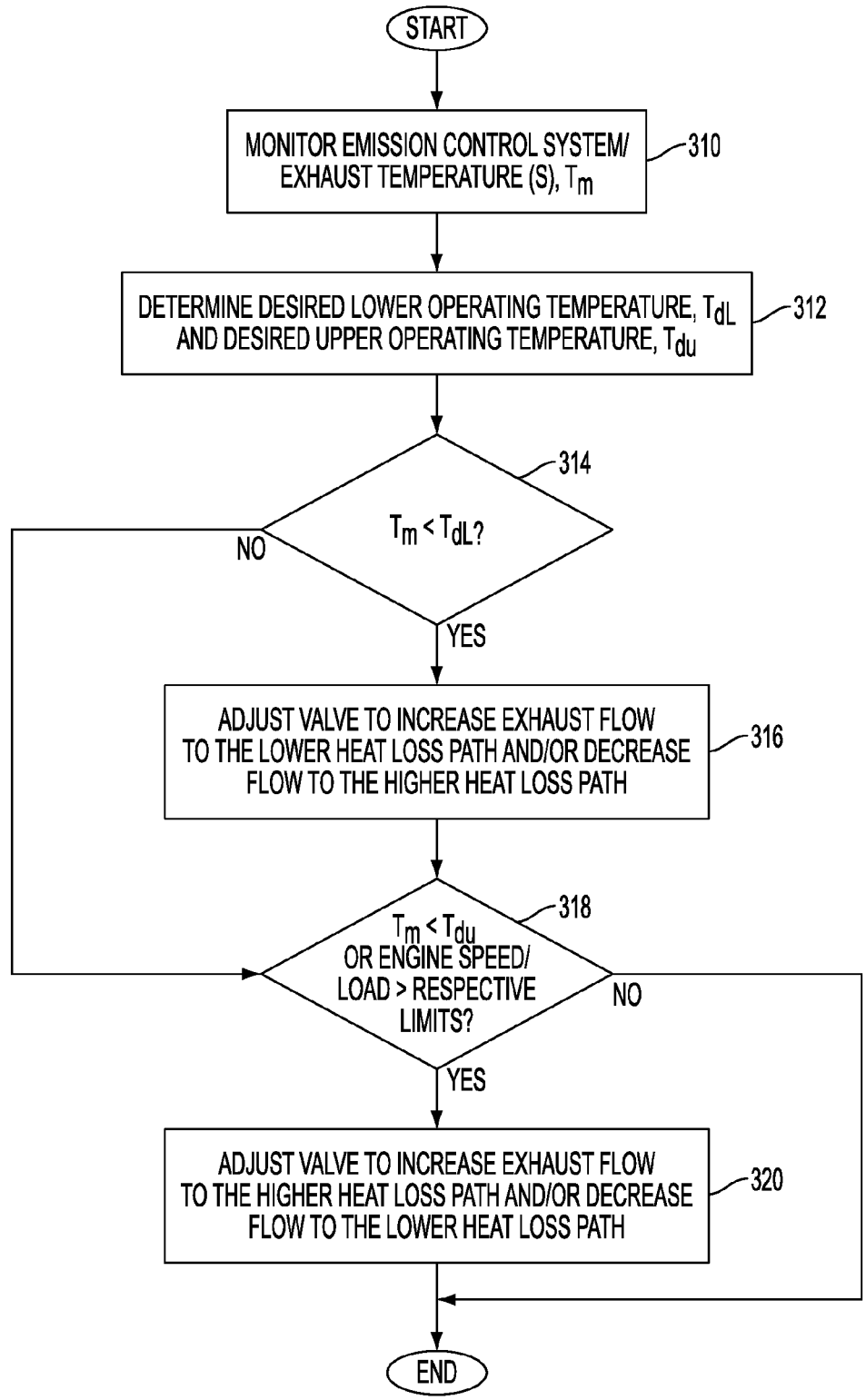
FIG. 3 is a flowchart illustrating control of the exhaust temperature for the improved operation of the emission control device by adjusting the amount of exhaust flow through the single-wall path and the double-wall path.

FIG. 3 shows a high-level flowchart of an example routine that may be implemented in a vehicle control system, such as an engine control unit (ECU). Specifically, the routine illustrates control of the exhaust temperature via adjustments of exhaust flow in a crossover in a parallel turbocharger system such as illustrated in FIGS. 1-2. First, the engine control unit (ECU) monitors the exhaust temperature Tm in 310. Then, the engine control unit (ECU) determines a desired lower operating temperature TdL and a desired upper operating temperature TdU in 312 based on various operating parameters, such as vehicle speed, engine speed, engine load, and/or others.

Next, the engine control unit (ECU) determines whether the exhaust temperature Tm is lower than the desired upper operating temperature TdU (Tm<TdL) in 314; and if Tm is less than TdL (Tm<TdL), the engine control unit (ECU) adjusts an exhaust valve (e.g., mechanism 214 in FIG. 1 or mechanism 224 in FIG. 2) to increase exhaust flow to the lower heat loss path and/or decrease exhaust flow to the higher heat loss path in 316. Otherwise, if Tm is not less than TdL (Tm≧TdL), the engine control unit (ECU) then determines if the exhaust temperature Tm is higher than the desired upper operating temperature TdU in 318 or engine speed and load are greater than respective limits; and if so, the engine control unit (ECU) adjusts the valve to increase exhaust flow to the higher heat loss path and/or decrease flow to the lower heat loss path in 320. Otherwise, the routine ends.

Note that the exhaust temperature Tm may be based on direct measurements via various sensors; it may be based on or estimated from various parameters, for example from various ambient and/or engine parameters, such as engine temperature, engine speed, engine intake air quantity, ambient temperature, ambient humidity, and/or ambient wind level; and/or it may also be based on parameters indicative of temperature of the exhaust, such as speed and load.

By controlling the operation of the control mechanism in a way exemplified in FIG. 3, it is possible to achieve more accurate control of exhaust temperature within a proper range for the efficient operation of the emission control device. For example, it may be possible to avoid or reduce situations where exhaust temperature is below a desired lower operating temperature TdL, and it may be possible to avoid or reduce situations where exhaust temperature is above a desired upper operating temperature TdU to reduce degradation of catalysts in the emission control device.

Figure 4:
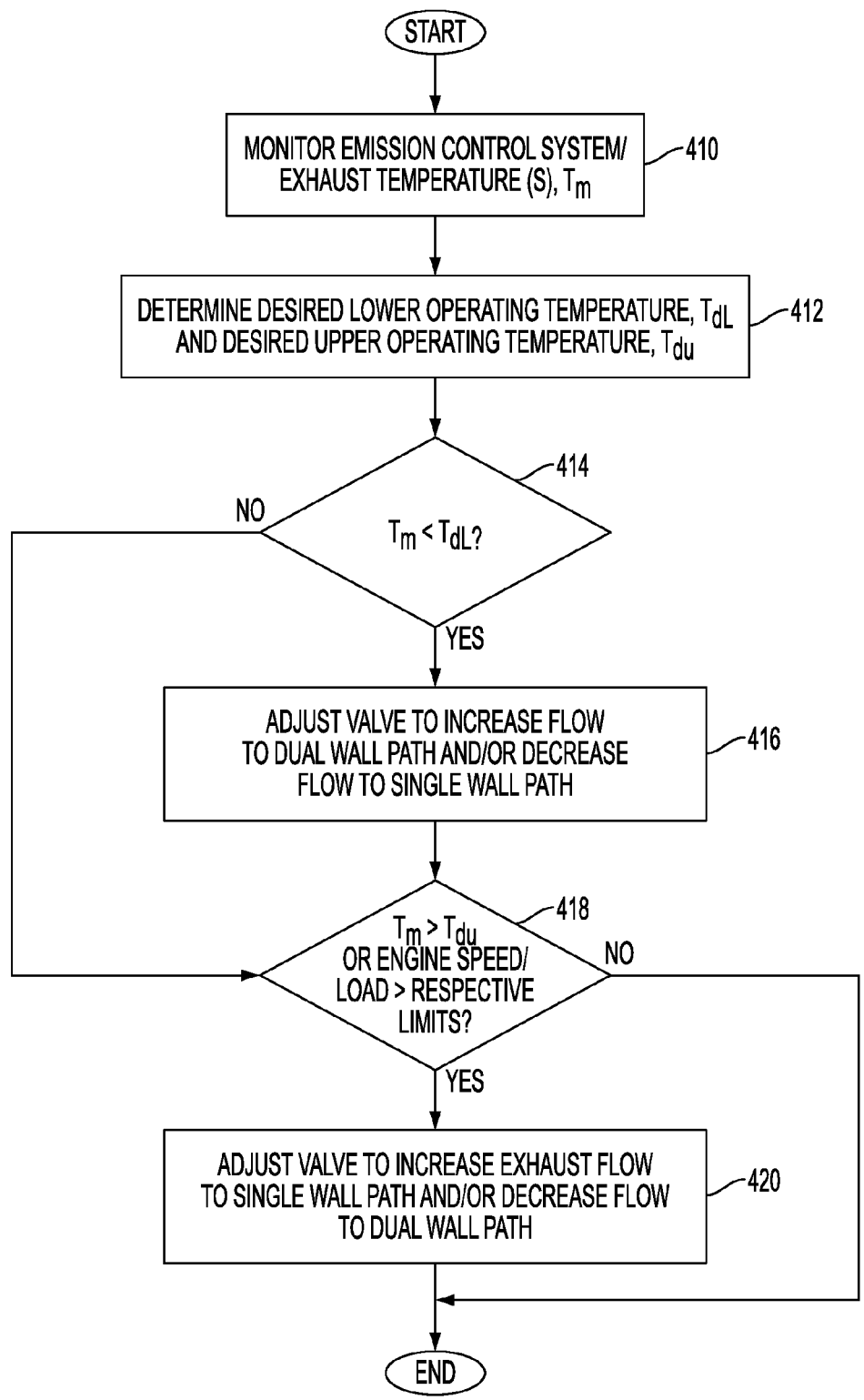
FIG. 4 is a flowchart illustrating control of the exhaust temperature for the improved operation of the emission control device by adjusting the amount of exhaust flow through the higher heat loss path and the lower heat loss path.
Figure 5:
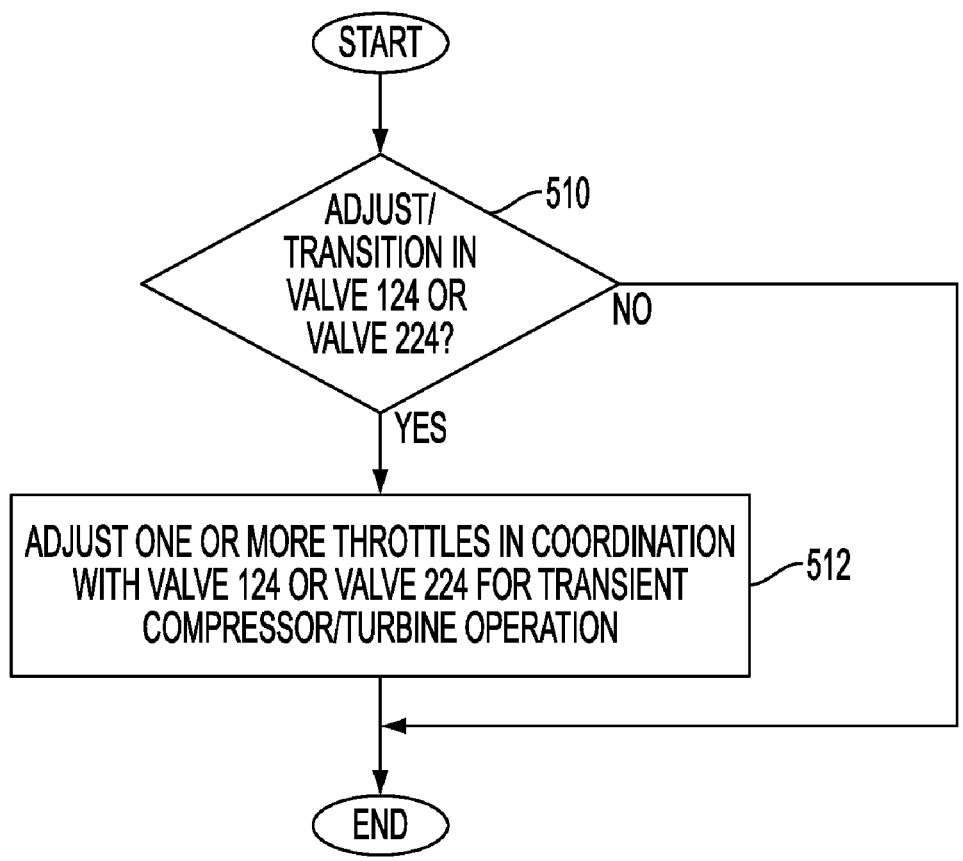
FIG. 5 is a flowchart illustrating compensation for transient compressor/turbine operation by adjusting one or more throttles in coordination with the control mechanism for adjusting the exhaust flow path.

FIG. 4 shows a high-level flowchart of an example routine that may be implemented in a vehicle control system, such as an engine control unit (ECU). Specifically, the routine shows control of exhaust flow through a crossover pipe in a parallel turbocharger system that has a dual wall path and a single wall path, such as illustrated in FIGS. 1-2. The engine control unit (ECU) monitors the exhaust temperature Tm 410; the engine control unit (ECU) then determines a desired lower operating temperature TdL and a desired upper operating temperature TdU 412; the engine control unit (ECU) next determines whether the exhaust temperature Tm is lower than the upper operating temperature TdU (Tm<TdL) 414; if Tm is less than TdL (Tm<TdL), the engine control unit (ECU) adjusts valve (e.g. control mechanism 124 in FIG. 1 and control mechanism 224 in FIG. 2) to increase exhaust flow to the dual wall path and/or decrease exhaust flow to the single wall path 416; if Tm is not less than TdL (Tm≦TdL), the engine control unit (ECU) then determines if the exhaust temperature Tm is higher than the upper operating temperature TdU (Tm>TdU) 418; if Tm is higher than TdU (Tm>TdU), the engine control unit (ECU) adjusts valve (e.g., control mechanism 214 in FIG. 1 and control mechanism 224 in FIG. 2) to increase exhaust flow to the single wall path and/or decrease flow to the dual wall path 420.

As discussed in reference to FIG. 3, the exhaust temperature Tm may be based on direct measurements via various sensors; it may be based on or estimated from various parameters, and/or it may also be based on parameters indicative of temperature of the exhaust.

Similarly, by controlling the operation of the control mechanism in a way exemplified in FIG. 4, it is possible to achieve more accurate control of exhaust temperature within a proper range for the efficient operation of the emission control device, as discussed in more detail in reference to FIG. 3.

In some embodiments, the engine control unit (ECU) may also adjust one or more throttles or other engine parameters such as fuel injection, cam timing, etc. in coordination with the control mechanism (e.g., control mechanism 124 in FIG. 1 or control mechanism 224 in FIG. 2), to compensate for transient engine and compressor/turbine operation to reduce transient torque errors, air-fuel errors, etc. In particular, the adjustment of the exhaust flow through the crossover (e.g., crossover 116 in FIG. 1 and crossover 216 in FIG. 2) may affect the turbocharger (and thus compressor) speeds, thereby affecting intake and exhaust pressure. The transient pressures and speeds may further generate transient airflow variations and cylinder charge variations that may cause transient torque disturbances, air-fuel ratio disturbances, etc. To reduce the potential for such transient disturbances, engine operation may be adjusted in coordination with adjustment of the crossover flow via control mechanism 124/224, such as described in FIG. 5.

Specifically, the engine control unit (ECU) determines whether there is any adjustment or transition in the control mechanism (e.g., control mechanism 124 in FIG. 1 and control mechanism 224 in FIG. 2) in 510. If there is an adjustment in the control mechanism, the engine control unit (ECU) then adjusts one or more throttles (e.g., throttle 232 in FIG. 2) in coordination with the control mechanism (e.g., control mechanism 224 in FIG. 2) for transient compressor/turbine operation in 510. Otherwise, the routine ends. For example, the routine may adjust throttle differently and therefore the flow differently to the first and second cylinder groups to compensate for the unequal turbocharging operation when or as the control mechanism increases the flow diverted from the first group to the second group.

In this way, it may be possible to reduce uneven turbocharging caused by different exhaust flow through each turbocharger. For example, when the engine control unit (ECU) (e.g., engine control unit 128 in FIG. 1 and engine control unit 228 in FIG. 2) adjusts the control mechanism (e.g., control mechanism 124 in FIG. 1 and control mechanism 224 in FIG. 2) to increase exhaust flow to the lower heat loss path (e.g., 118 in FIG. 1 and 218 in FIG. 2), the first turbocharger may receive more exhaust flow and may spin faster than the second turbocharger (e.g., 112 in FIG. 1 and 212 in FIG. 2), therefore the intake air will be compressed more on the side of the first turbocharger than on the side of the second turbocharger, which consequently may result uneven distribution of compressed air into different engine cylinders. The compensation mechanism described in FIG. 5 may adjust various engine throttles to equalize intake air compression by both turbochargers, for example here by possibly decreasing the flow of intake air passing the compressor of the first turbocharger.

Figure 6:
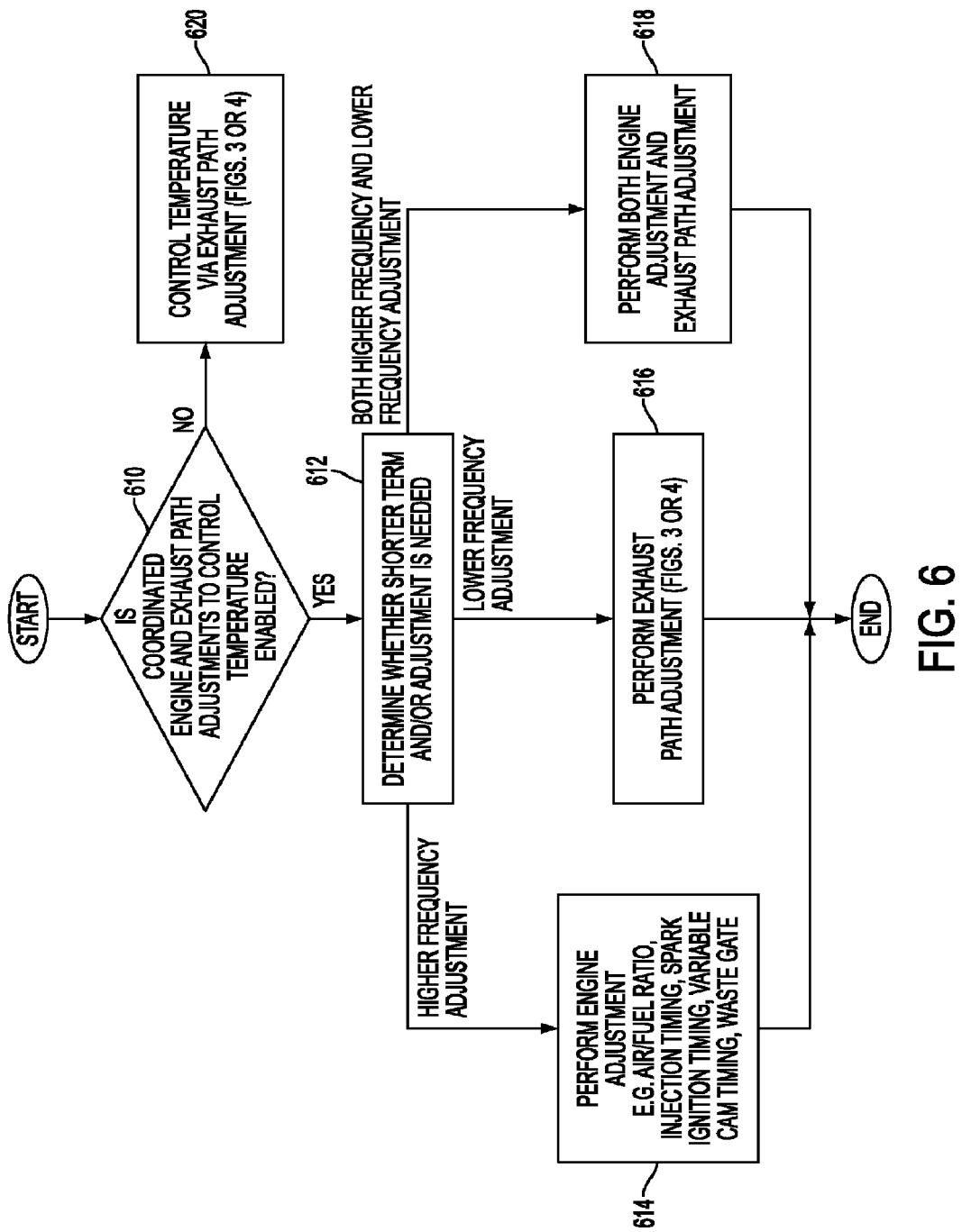
FIG. 6 is a flowchart illustrating selection of whether to use engine adjustments, exhaust path adjustments, or both engine adjustments and exhaust path adjustments to control exhaust temperature.

As noted herein, exhaust temperature may be controlled or adjusted by exhaust flow path adjustments, by engine adjustments, or by both exhaust flow path adjustments and engine adjustments. For example, the routine of FIG. 6 illustrates the selection of various temperature adjustments based on operating conditions to achieve improved temperature control across engine and vehicle operation. Specifically, the engine control unit (ECU) determines whether coordinated engine and exhaust path adjustments for controlling exhaust temperature is enabled in 610 based on various parameters, such as time since engine start, turbocharger status, and/or others. If the coordinated engine and exhaust path adjustments for controlling exhaust temperature is enabled, the engine control unit (ECU) then determines whether higher frequency or lower frequency exhaust temperature adjustment is needed in 612, base on, for example, a rate of change of temperature control error and/or other operating conditions. If only higher frequency exhaust temperature adjustment is needed, the engine control unit (ECU) then determines which one or a combination of engine adjustments may be used and then performs the necessary engine adjustments, for example by adjusting air/fuel ratio, by controlling injection timing, by controlling spark ignition timing, by adjusting the variable cam timing, by adjusting the waste gate operation in 614. If both higher frequency and lower frequency exhaust temperature adjustments are needed, the engine control unit then controls the exhaust temperature by adjusting the engine parameters and by adjusting the exhaust path in 618. Finally, if only lower frequency engine adjustment is needed, the engine control unit then adjusts the exhaust flow path in 616.

Still referring to FIG. 6, if coordinated engine and exhaust path adjustments for controlling exhaust temperature is not enabled, then the engine control unit (ECU) controls the exhaust temperature by adjusting the exhaust path in 620.

In this way, it may be possible to select appropriate temperature adjustment mechanism for appropriate conditions and to achieve advantages such as reduce transitions in exhaust flow and turbocharging operation.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method for controlling exhaust temperature for optimal operation of an emission controlling device comprising:
   exhausting gas from a first set of cylinders to a first turbocharger, and then through a lower heat loss path to the emission control device; and
   exhausting gas from a second set of cylinders to a second turbocharger, and then through a higher heat loss path to the emission control device; and
   passing at least a portion of gas from the second turbocharger and second path to the first turbocharger and the first path only during selected reduced temperature conditions, the selected reduced temperature conditions based on a rate of change of temperature control error.

2. The method for controlling the exhaust temperature according to claim 1, wherein the exhaust temperature is additionally controlled by adjusting various engine parameters including adjusting at least one of air/fuel ratio, injection timing, and spark ignition timing based on the rate of change of temperature control error.

3. The method for controlling exhaust temperature according to claim 1, wherein an engine control unit (ECU) varies exhaust path adjustments and engine parameter adjustments to control exhaust temperature as operating conditions vary.

4. The method for controlling exhaust temperature according to claim 1, wherein an engine control unit (ECU) adjusts one or more throttle valves in coordination with a control mechanism for adjusting exhaust flow for transient compressor/turbine operation.

5. A method for controlling exhaust temperature of an emission device, comprising:
   exhausting gas from a first set of cylinders to a first turbocharger, and then through a lower heat loss path to the emission device;
   exhausting gas from a second set of cylinders to a second turbocharger, and then through a higher heat loss path to the emission device; and
   adjusting operation in response to a rate of change of temperature control error, including varying an amount of exhaust gas flowing from the first set of cylinders to the second path as temperature varies during a first rate of change and adjusting an engine operating parameter to affect exhaust temperature as temperature varies during a second rate of change.

6. The method for controlling exhaust temperature according to claim 5, further comprising adjusting the engine operating parameter in coordination with the varying of exhaust gas flow amounts for transient compressor/turbine operation.

7. An exhaust system for an engine having a first set and a second set of cylinders and an emission control device comprising:
   a first turbocharger coupled to the first set of cylinder(s);
   a second turbocharger coupled to the second set of cylinder(s);
   a crossover pipe coupled between and upstream of the first and second turbochargers;
   a mechanism for adjusting exhaust flow through the crossover pipe;
   a higher heat loss path coupled between the first turbocharger and the emission control device;
   a lower heat loss path coupled between the second turbocharger and the emission control device; and
   an engine control unit including a non-transitory computer readable storage medium having code programmed therein, including, code for adjusting the mechanism in response to a rate of change of temperature control error.

8. The exhaust system according to claim 7 wherein the mechanism for adjusting exhaust flow through the crossover pipe is a valve.

9. The exhaust system according to claim 7, wherein the lower heat loss path is a double-wall pipe.

10. The exhaust system according to claim 7, wherein the higher heat loss path is a single-wall pipe.

11. The exhaust system according to claim 7, wherein the higher heat loss path contains more pipe bends compared to the lower heat loss path to increase its cooling effect on the exhaust.

12. The exhaust system according to claim 7, wherein the higher heat loss path contains a cooling device that cools the exhaust flows through the higher heat loss path.

13. The exhaust system according to claim 7, wherein the higher heat loss path is a single-wall pipe that contains more pipe bends and a lower number of walls than the lower heat loss path.

14. The exhaust system according to claim 13, wherein the lower heat loss path is a double-wall pipe.

15. The exhaust system according to claim 7, wherein the lower heat loss path contains a heating mechanism that heats up the exhaust flowing through the lower heat loss path.

16. The exhaust system according to claim 7, wherein the lower heat loss path contains an insulating layer that insulate the heat loss from the exhaust flowing through the lower heat loss path.

17. The exhaust system according to claim 7, wherein the turbochargers are variable geometry turbochargers.

18. The exhaust system according to claim 7, wherein the dual turbochargers are fixed geometry turbochargers.

19. The exhaust system according to claim 7, wherein the control mechanism for controlling exhaust flow through the crossover is immediately upstream of the higher heat loss path.

20. The exhaust system according to claim 7, wherein the emission control device includes a catalytic converter.

21. The exhaust system according to claim 7, wherein the first set of cylinders is a first engine bank and the second set of cylinders is a second engine bank.

\* \* \* \* \*